(12) United States Patent
Oakley et al.

(10) Patent No.: US 7,918,289 B2
(45) Date of Patent: Apr. 5, 2011

(54) METHOD OF COMPLETING A WELL WITH SAND SCREENS

(75) Inventors: Doug Oakley, Bradford-On-Avon (GB); Gunnar Fimreite, Lyngby (DK); Grete Svanes, Nesttun (NO); Jarrod Massam, Aberdeen (GB); Andrew Bradbury, Banchory (GB)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 11/767,143

(22) Filed: Jun. 22, 2007

(65) Prior Publication Data

US 2008/0041589 A1 Feb. 21, 2008

Related U.S. Application Data

(63) Continuation-in-part of application No. 11/162,850, filed on Sep. 26, 2005, now Pat. No. 7,589,049, and a continuation-in-part of application No. 11/617,576, filed on Dec. 28, 2006, now Pat. No. 7,409,994, and a continuation-in-part of application No. 11/617,031, filed on Dec. 28, 2006, now abandoned, and a continuation-in-part of application No. 11/741,199, filed on Apr. 27, 2007, and a continuation-in-part of application No. 11/741,689, filed on Apr. 27, 2007, now Pat. No. 7,618,927, which is a continuation-in-part of application No. 11/162,850, filed on Sep. 26, 2005, now Pat. No. 7,589,049, which is a continuation of application No. 10/274,528, filed on Oct. 18, 2002, now abandoned, which is a continuation-in-part of application No. 09/230,302, filed as application No. PCT/EP97/003802 on Jul. 16, 1997, now Pat. No. 6,586,372, said application No. 11/741,689 is a continuation-in-part of application No. 11/617,576, filed on Dec. 28, 2006, now Pat. No. 7,409,994, which is a continuation of application No. 11/145,054, filed on Jun. 3, 2005, now Pat. No. 7,176,165, said application No. 11/741,689 is a continuation of application No. 11/617,031, filed on Dec. 28, 2006, now abandoned, which is a continuation of application No. 11/145,053, filed on Jun. 3, 2005, now Pat. No. 7,169,738, said application No. 11/741,689 is a continuation-in-part of application No. 11/145,259, filed on Jun. 3, 2005, now Pat. No. 7,220,707, said application No. 11/741,689 is a continuation-in-part of application No. 11/741,199, filed on Apr. 27, 2007.

(60) Provisional application No. 60/576,420, filed on Jun. 3, 2004, provisional application No. 60/825,156, filed on Sep. 11, 2006.

(30) Foreign Application Priority Data

Jul. 24, 1996 (GB) .................................. 9615549.4

(51) Int. Cl.
*E21B 7/18* (2006.01)
(52) U.S. Cl. .............................. 175/65; 175/72; 166/278
(58) Field of Classification Search ........................ None
See application file for complete search history.

(56) References Cited

U.S. PATENT DOCUMENTS 3,057,797 A 10/1962 Anderson et al.
(Continued)

FOREIGN PATENT DOCUMENTS

GB 605173 7/1948
(Continued)

OTHER PUBLICATIONS

PCT International Search Report dated Feb. 29, 2008 issued in Application No. PCT/US2007/078159 (4 pages).
(Continued)

*Primary Examiner* — Zakiya W. Bates
(74) *Attorney, Agent, or Firm* — Osha • Liang LLP

(57) ABSTRACT

A method for drilling and completing a wellbore that includes drilling a wellbore through a subterranean formation with a wellbore fluid, the wellbore fluid comprising: a base fluid; and micronized weighting agent; and disposing a sand screen in an interval of the wellbore with the wellbore fluid is disclosed.

11 Claims, 2 Drawing Sheets

U.S. PATENT DOCUMENTS

| | | | | |
|---|---|---|---|---|
| 3,622,513 A * | 11/1971 | Miller | ............................ | 507/126 |
| 3,675,717 A * | 7/1972 | Goins et al. | .................... | 166/278 |
| 4,141,843 A * | 2/1979 | Watson | ........................... | 507/207 |
| 4,554,307 A * | 11/1985 | Farrar et al. | .................... | 524/425 |
| 4,776,966 A * | 10/1988 | Baker | ............................ | 507/117 |
| H1685 H * | 10/1997 | Lau et al. | ....................... | 507/140 |
| 7,618,927 B2 | 11/2009 | Massam et al. | | |
| 2004/0127366 A1 | 7/2004 | Bradbury et al. | | |
| 2005/0139394 A1 | 6/2005 | Maurer et al. | | |
| 2005/0277553 A1 | 12/2005 | Massam et al. | | |
| 2007/0105724 A1 | 5/2007 | Massam et al. | | |
| 2007/0105725 A1 | 5/2007 | Massam et al. | | |
| 2007/0184987 A1 | 8/2007 | Brandbury et al. | | |
| 2007/0281867 A1 | 12/2007 | Massam et al. | | |
| 2007/0287637 A1 | 12/2007 | Bradbury et al. | | |
| 2008/0064613 A1 | 3/2008 | Massam | | |

FOREIGN PATENT DOCUMENTS

| | | |
|---|---|---|
| WO | 2005118742 | 12/2005 |

OTHER PUBLICATIONS

PCT Written Opinion dated Feb. 29, 2008 issued in Application No. PCT/US2007/078159 (9 pages).

C. W. Blount, "Synthesis of Barite, Celestite, Anglesite, Witherite and Strontianite from Aqueous Solutions" American Mineralogist, vol. 59, 1974, pp. 1209-1219.

PCT International Search Report issued in PCT Application No. PCT/US2008/062916 dated Sep. 26, 2008 (5 pages).

PCT Written Opinion issued in PCT Application No. PCT/US2008/062916 dated Sep. 26, 2008 (6 pages).

Nils Kageson-Loe et al. Formation Damage Observations on Oil-based Fluid Systems Weighted with Treated Micronized Barite; Society of Petroleum Engineers, SPE 107802 (2007) pp. 1-10.

Louise Roedbro et al., The Design of HIgh Performance Drill-In Fluids with a View to Maximizing Production; American Association of Drilling Engineers, AADE-07-NTCE-23 (2007) pp. 1-10.

Australian Examiner's Report for Australian Application No. 2007294625, mailed on Mar. 4, 2010 (2 pages).

Office Action issued in European Application No. 07784448.8 dated May 3, 2010 (4 pages).

Examiner's Report issued in Australian Application No. 2007296539 dated Jun. 2, 2010 (2 pages).

Office Action issued in Mexican Application No. MX/a/2009/002614 dated Jun. 29, 2010 (4 pages).

Office Action issued in Canadian Application No. 2,663,192 dated Jul. 29, 2010 (2 pages).

Office Action issued in New Zealand Application No. 575494 dated Aug. 3, 2010 (2 pages).

Office Action issued in Canadian Application No. 2,661,918 dated Jul. 27, 2010 (2 pages).

Office Action issued in Canadian Application No. 2,663,117 dated Jul. 29, 2010 (4 pages).

Examination Report issued in New Zealand Application No. 575007 dated Aug. 2, 2010 (2 pages).

Office Action issued in European Application No. 07842243.3 dated Sep. 7, 2010 (5 pages).

Limin Qi, Helmut Colfen, and Markus Antonietti: "Control of Barite Morphology by Doubld-Hyrophilic Block Copolymers" Mater. Chem., vol. 12, No. 8, dated Jul. 29, 2010, pp. 2392-2402, DOI: 10.1021/cm0010405.

Louise Roedbro et al., The Design of High Performance Drill-In Fluids with a View to Maximizing Production; American Association of Drilling Engineers, AADE-07-NTCE-23 (2007) pp. 1-10.

International Search Report with Written Opinion issued in PCT Application No. US2008/075588 dated Jun. 30, 2009. (14 pages).

Office Action issued in New Zealand Application No. 575495 dated Oct. 6, 2010 (2 pages).

Office Action issued in The United Kingdom Application No. GB0905100.4 dated Nov. 5, 2010 (5 pages).

Office Action issued in The United Kingdom Application No. GB0812577.5 dated Nov. 12, 2010 (4 pages).

\* cited by examiner

METHOD OF COMPLETING A WELL WITH SAND SCREENS

CROSS-REFERENCE TO RELATED APPLICATIONS

This application is a continuation-in-part application of co-pending U.S. patent application Ser. No. 11/162,850, which is a continuation application of U.S. patent application Ser. No. 10/274,528, which is a continuation-in-part of U.S. application Ser. No. 09/230,302, now U.S. Pat. No. 6,586,372, which is the U.S. national phase application under 35 U.S.C. §371 of a POT International Application No. PCT/EP97/003802, filed Jul. 16, 1997 which in turn claims priority under the Paris Convention to United Kingdom Patent Application No. 9615549.4 filed Jul. 24, 1996. This application is also a continuation-in-part application of co-pending U.S. patent application Ser. No. 11/617,576, which is a continuation application of U.S. patent application Ser. No. 11/145,054, now U.S. Pat. No. 7,176,165, which claims priority to U.S. Provisional Application Ser. No. 60/576,420. This application is also a continuation-in-part application of co-pending U.S. patent application Ser. No. 11/617,031, which is a continuation application of U.S. patent application Ser. No. 11/145,053, now U.S. Pat. No. 7,169,738, which claims priority to U.S. Provisional Application Ser. No. 60/576,420. This application is also a continuation-in-part application of U.S. patent application Ser. No. 11/741,199, which claims priority to U.S. Provisional Application Ser. No. 60/825,156. This application is also a continuation-in-part application of co-pending U.S. patent application Ser. No. 11/741,689, which is a continuation-in-part of U.S. patent application Ser. No. 11/162,850, U.S. patent application Ser. No. 11/617,576, U.S. patent application Ser. No. 11/617,031, U.S. patent application Ser. No. 11/741,199, and U.S. patent application Ser. No. 11/145,259, which claims priority to U.S. Provisional Application Ser. No. 60/576,420. Each of the above listed priority documents is hereby incorporated by reference.

BACKGROUND OF INVENTION

1. Field of the Invention

Embodiments disclosed herein relate generally to methods of completing a well with a sand screen. In particular, embodiments disclosed herein relate generally to wellbore fluids used in completing a well with a sand screen.

2. Background Art

During the drilling of a wellbore, various fluids are typically used in the well for a variety of functions. The fluids may be circulated through a drill pipe and drill bit into the wellbore, and then may subsequently flow upward through wellbore to the surface. Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the format ion through which the well is being drilled, fracturing the formation in the vicinity of the well, displacing the fluid within the well with another fluid, cleaning the well, testing the well, transmitting hydraulic horsepower to the drill bit, fluid used for emplacing a packer, abandoning the well or preparing the well for abandonment, and otherwise treating the well or the formation.

Once the well has been drilled and a hydrocarbon reservoir has been encountered, the well is ready to be completed. In the course of completing a well, it is common practice to run a string of casing into the well bore and then to run the production tubing inside the casing. At the producing interval (s) of the formation, perforations are typically created to extend through the casing string, through the cement that secures the casing string in place, and a short distance into the formation. These perforations may be created by detonating shaped charges carried in a perforating gun. The perforations created cross one or more production zones to allow production fluids to enter the interior of the wellbore.

Once the perforations are created, however, the formation pressure must be controlled. Typically, this is achieved by loading a completion fluid into the wellbore during the completion process. The completion fluid is selected to have a density sufficient to create an overbalanced hydrostatic pressure regime at the location(s) of the wellbore perforations, thereby preventing formation fluids from entering the wellbore.

After the well is perforated, a stimulation or sand control treatment process may be performed. Sand control processes may prevent, after the well is completed and placed in production, formation sand from unconsolidated formations being swept into the flow path along with formation fluid, which erodes production components in the flow path. Similarly, in uncased boreholes, where an open face is established across the oil or gas bearing zone, formation sand from unconsolidated formations may also be swept into the flow path along with formation fluid.

Thus, with either cased or uncased well bores, one or more sand screens may be installed in the flow path between the production tubing and the perforated casing.

Additionally, the annulus around the screen may be packed with a relatively coarse sand or gravel which acts as a filter to reduce the amount of fine formation sand reaching the screen and seals off the annulus in the producing zone from nonproducing formations. When the sand tries to move through the gravel, it is filtered and held by the gravel and/or screen, but formation fluids continue to flow unhindered (by either the gravel or screen) into the wellbore.

Following the treatment process, it is typically necessary to have the completion fluid remain in the wellbore to control formation pressure during the remainder of the completion process. Typically, these processes includes tripping portions of the work string out of the wellbore and installing a production tubing string within the wellbore to provide the conduit through which formation fluids travel from the formation depth to the surface. In addition, the production tubing string may include various operating tools including flow control devices, safety devices and the like which regulate and control the production of fluid from the wellbore. Once the production tubing string has been installed and the completion fluid is removed from the well, production may begin.

Conventionally, the fluid used during drilling operations contains solid weighting agents, viscosifying solids, and other solids in order to produce a fluid having the density and Theological properties required for drilling the well. However, if the solids-laden fluid is still in the wellbore during the completion operation and placement of equipment, the solids present in the fluid can potentially plug the screens and severely impair production rates. Thus, a completion fluid is typically used to displace the drilling fluid and to run the sand-exclusion equipment and gravel packing tools in a generally solids-free environment.

High-density completion fluids are often necessary in well completions to maintain sufficient hydrostatic pressure to control the bottom hole pressures of the producing zones for relatively higher pressure producing zones. However, high-density completion brines can be very expensive, dangerous to field personnel, and often times damaging to the producing zones.

Accordingly, there exists a continuing need for wellbore fluids that can be used in completion operations.

SUMMARY OF INVENTION

In one aspect, embodiments disclosed herein relate to a method for drilling and completing a wellbore that includes drilling a wellbore through a subterranean formation with a wellbore fluid, the wellbore fluid comprising: a base fluid; and micronized weighting agent; and disposing a sand screen in an interval of the wellbore with the wellbore fluid.

In another aspect, embodiments disclosed herein relate to a method for drilling and completing a wellbore that includes drilling a wellbore through a subterranean formation with a wellbore fluid, the wellbore fluid comprising: a base fluid; and dispersant coated micronized weighting agent; and disposing a sand screen in an interval of the wellbore with the wellbore fluid.

Other aspects and advantages of the invention will be apparent from the following description and the appended claims.

DETAILED DESCRIPTION

According to various embodiments, the wellbore fluids of the present disclosure may be used in screened completion operations, where a sand exclusion screen is placed in a producing interval of the wellbore to reduce or prevent reservoir sands from flowing into the well. In one embodiment, the wellbore fluid may include a base fluid (including oil- or water-based fluids) and a micronized weighting agent.

Figure 1:
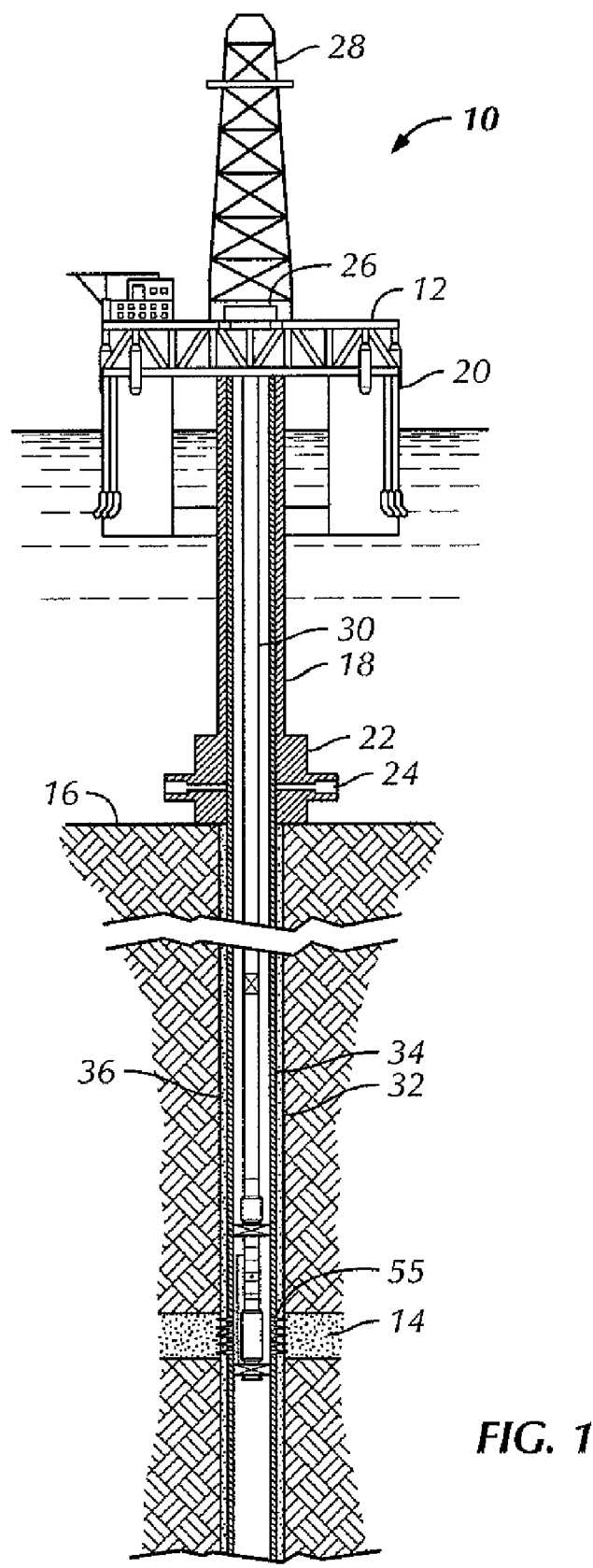
FIG. 1 is a schematic illustration of an oil platform operating a system for completing a well in accordance with one embodiment of the present disclosure.
Figure 2:
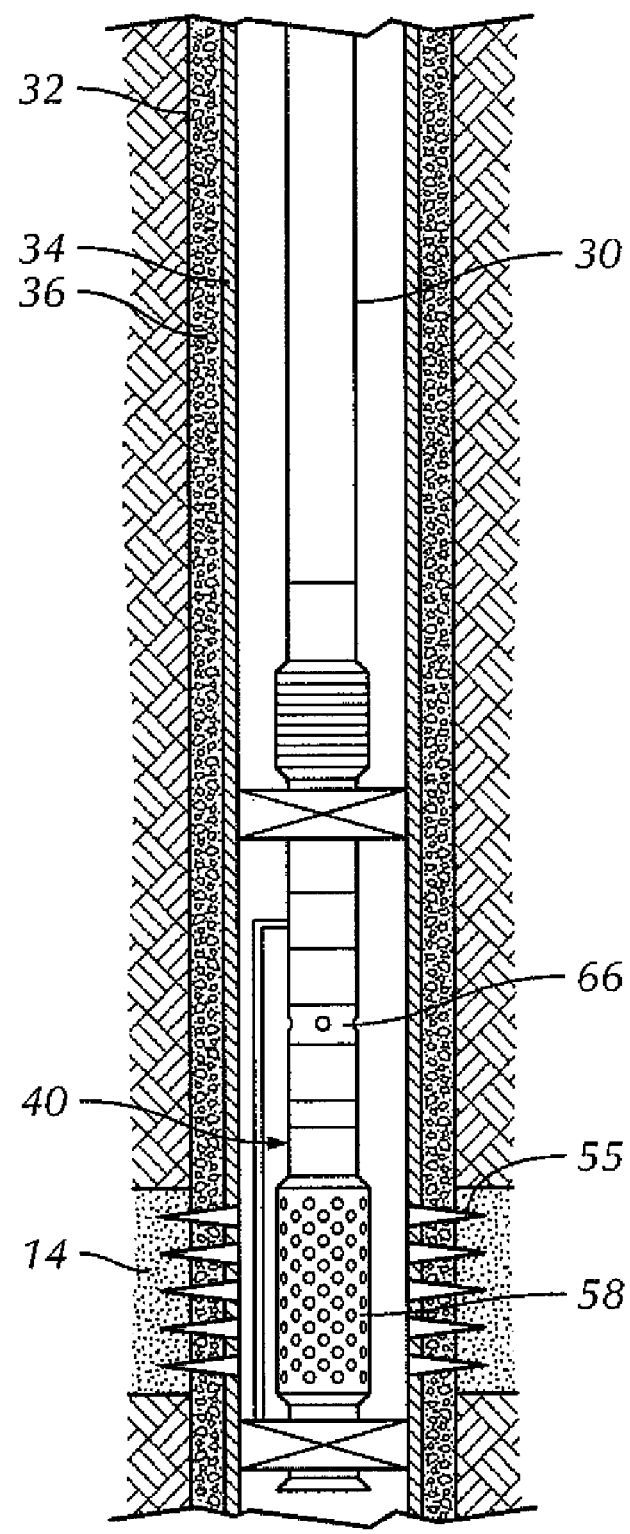
FIG. 2 is a schematic illustration of the system of FIG. 1 in accordance with one embodiment of the present disclosure.

Referring to FIGS. 1 and 2, a downhole completion operation 10 being operated from an offshore platform 12 is shown. A semi-submersible platform 12 is centered over a submerged oil and gas formation 14 located below sea floor 16. A subsea conduit 18 extends from deck 20 of platform 12 to wellhead installing 22 including blowout prevents 24. Platform 12 has a hoisting apparatus 26 and a derrick 28 for raising and lowering pipe such as tubing string 30.

A wellbore 32 extends through various earth strata including formation 14. A casing 34 is cemented within wellbore 32 by cement 36. Positioned within casing 32 is a downhole completion system. Specifically, the downhole completion system includes, tubing string assembly 40 and perforating assembly (not shown) for forming perforations 55 through the casing 32, cement 36, and a small distance into formation 14. Tubing string assembly 40 includes, inter alia, a sand control screen assembly 58 and a ported sleeve 66.

Upon perforation of the formation 14, sand control screen assembly 58 may be positioned proximate perforations 55. A treatment slurry such as a fracture fluid may be pumped down tubing string assembly 40, out port sleeve 66, and forced into formation 14 such that fractures (not shown) are formed in the production interval of formation 14. In various embodiments, the fracture fluid may carry therein a proppant or other solid agent into the fractures for the purpose of propping fractures open in formation 14.

Sand control screen assembly 58 provides for the filtration of formation fluid and the prevention of formation fines or sands and packing-solids, such as sand, gravel, or proppants from entering the interior of the tubing string assembly 40 during production from formation 14 and completion of the well. Sand screen assembly 58 may have any type of suitable filtration media, including, for example, a porous wire mesh screen designed to allow fluid flow therethrough, but prevent the flow of particulate materials of a predetermined size from passing therethrough.

In conventional completion operations, prior to perforating or otherwise completing the well, a high density, solids-free completion fluid is typically pumped down tubing string assembly 40 and exits through ported sleeve 60 into the annulus between tubing string assembly 40 and casing 34. However, according to embodiments of the present disclosure, a wellbore fluid containing a base fluid and a micronized weighting agent used in drilling operations remains in the wellbore through at least one completion operations, such as for example, perforating the wellbore, running a sand screen assembly into a desired interval of the wellbore, gravel-packing, and/or stimulation of the formation, etc. In a particular embodiment, a wellbore fluid according to the present disclosure may be used in drilling and completing a well, and may remain in the wellbore until production of the formation fluids.

Micronized Weighting Agent

Fluids used in embodiments disclosed herein may include micronized weighting agents. In some embodiments, the micronized weighting agents may be uncoated. In other embodiments, the micronized weighting agents may be coated with a dispersant.

For example, fluids used in some embodiments disclosed herein may include dispersant coated micronized weighting agents. The coated weighting agents may be formed by either a dry coating process or a wet coating process. Weighting agents suitable for use in other embodiments disclosed herein may include those disclosed in U.S. Patent Application Publication Nos. 20040127366, 20050101493, 20060188651, U.S. Pat. Nos. 6,586,372 and 7,176,165, and U.S. Provisional Application Ser. No. 60/825,156, each of which is hereby incorporated by reference.

Micronized weighting agents used in some embodiments disclosed herein may include a variety of compounds well known to one of skill in the art. In a particular embodiment, the weighting agent may be selected from one or more of the materials including, for example, barium sulphate (barite), calcium carbonate (calcite), dolomite, ilmenite, hematite or other iron ores, olivine, siderite, manganese oxide, and strontium sulphate. One having ordinary skill in the art would recognize that selection of a particular material may depend largely on the density of the material as typically, the lowest wellbore fluid viscosity at any particular density is obtained by using the highest density particles. However, other considerations may influence the choice of product such as cost, local availability, the power required for grinding, and whether the residual solids or filter cake may be readily removed from the well.

In one embodiment, the micronized weighting agent may have a $d_{90}$ ranging from 1 to 25 microns and a $d_{50}$ ranging from 0.5 to 10 microns. In another embodiment, the micronized weighting agent includes particles having a $d_{90}$ ranging from 2 to 8 microns and a $d_{50}$ ranging from 0.5 to 5 microns. One of ordinary skill in the art would recognize that, depending on the sizing technique, the weighting agent may have a particle size distribution other than a monomodal distribution. That is, the weighting agent may have a particle size distribution that, in various embodiments, may be monomodal, which may or may not be Gaussian, bimodal, or polymodal.

It has been found that a predominance of particles that are too fine (i.e. below about 1 micron) results in the formation of a high rheology paste. Thus, it has been unexpectedly found that the weighting agent particles must be sufficiently small to avoid issues of sag, but not so small as to have an adverse impact on rheology. Thus weighting agent (barite) particles meeting the particle size distribution criteria disclosed herein may be used without adversely impacting the rheological properties of the wellbore fluids. In one embodiment, a micronized weighting agent is sized such that: particles having a diameter less than 1 microns are 0 to 15 percent by volume; particles having a diameter between 1 microns and 4 microns are 15 to 40 percent by volume; particles having a diameter between 4 microns and 8 microns are 15 to 30 by volume; particles having a diameter between 8 microns and 12 microns are 5 to 15 percent by volume; particles having a diameter between 12 microns and 16 microns are 3 to 7 percent by volume; particles having a diameter between 16 microns and 20 microns are 0 to 10 percent by volume; particles having a diameter greater than 20 microns are 0 to 5 percent by volume. In another embodiment, the micronized weighting agent is sized so that the cumulative volume distribution is: less than 10 percent or the particles are less than 1 microns; less than 25 percent are in the range of 1 microns to 3 microns; less than 50 percent are in the range of 2 microns to 6 microns; less than 75 percent are in the range of 6 microns to 10 microns; and less than 90 percent are in the range of 10 microns to 24 microns.

The use of micronized weighting agents has been disclosed in U.S. Patent Application Publication No. 20050277553 assigned to the assignee of the current application, and herein incorporated by reference. Particles having these size distributions may be obtained by several means. For example, sized particles, such as a suitable barite product having similar particle size distributions as disclosed herein, may be commercially purchased. A coarser ground suitable material may be obtained, and the material may be further ground by any known technique to the desired particle size. Such techniques include jet-milling, ball milling, high performance wet and dry milling techniques, or any other technique that is known in the art generally for milling powdered products. In one embodiment, appropriately sized particles of barite may be selectively removed from a product stream of a conventional barite grinding plant, which may include selectively removing the fines from a conventional API-grade barite grinding operation. Fines are often considered a by-product of the grinding process, and conventionally these materials are blended with courser materials to achieve API-grade barite, However, in accordance with the present disclosure, these by-product fines may be further processed via an air classifier to achieve the particle size distributions disclosed herein. In yet another embodiment, the micronized weighting agents may be formed by chemical precipitation. Such precipitated products may be used alone or in combination with mechanically milled products.

In some embodiments, the micronized weighting agents include solid colloidal particles having a deflocculating agent or dispersant coated onto the surface of the particle. Further, one of ordinary skill would appreciate that the term "colloidal" refers to a suspension of the particles, and does not impart any specific size limitation. Rather, the size of the micronized weighting agents of the present disclosure may vary in range and are only limited by the claims of the present application. The micronized particle size generates high density suspensions or slurries that show a reduced tendency to sediment or sag, while the dispersant on the surface of the particle controls the inter-particle interactions resulting in lower Theological profiles. Thus, the combination of high density, fine particle size, and control of colloidal interactions by surface coating the particles with a dispersant reconciles the objectives of high density, lower viscosity and minimal sag.

In some embodiments, a dispersant may be coated onto the particulate weighting additive during the comminution (grinding) process. That is to say, coarse weighting additive is ground in the presence of a relatively high concentration of dispersant such that the newly formed surfaces of the fine particles are exposed to and thus coated by the dispersant. It is speculated that this allows the dispersant to find an acceptable conformation on the particle surface thus coating the surface. Alternatively, it is speculated that because a relatively higher concentration of dispersant is in the grinding fluid, as opposed to that in a drilling fluid, the dispersant is more likely to be absorbed (either physically or chemically) to the particle surface. As that term is used in herein, "coating of the surface" is intended to mean that a sufficient number of dispersant molecules are absorbed (physically or chemically) or otherwise closely associated with the surface of the particles so that the fine particles of material do not cause the rapid rise in viscosity observed in the prior art. By using such a definition, one of skill in the art should understand and appreciate that the dispersant molecules may not actually be fully covering the particle surface and that quantification of the number of molecules is very difficult. Therefore, by necessity, reliance is made on a results oriented definition. As a result of the process, one can control the colloidal interactions of the fine particles by coating the particle with dispersants prior to addition to the drilling fluid. By doing so, it is possible to systematically control the Theological properties of fluids containing in the additive as well as the tolerance to contaminants in the fluid in addition to enhancing the fluid loss (filtration) properties of the fluid.

In some embodiments, the weighting agents include dispersed solid colloidal particles with a weight average particle diameter ($d_{50}$) of less than 10 microns that are coated with a polymeric deflocculating agent or dispersing agent. In other embodiments, the weighting agents include dispersed solid colloidal particles with a weight average particle diameter ($d_{50}$) of less than 8 microns that are coated with a polymeric deflocculating agent or dispersing agent; less than 6 microns in other embodiments; less than 4 microns in other embodiments; and less than 2 microns in yet other embodiments. The fine particle size will generate suspensions or slurries that will show a reduced tendency to sediment or sag, and the polymeric dispersing agent on the surface of the particle may control the inter-particle interactions and thus will produce lower Theological profiles. It is the combination of fine particle size and control of colloidal interactions that reconciles the two objectives of lower viscosity and minimal sag. Additionally, the presence of the dispersant in the comminution process yields discrete particles which can form a more efficiently packed filter cake and so advantageously reduce filtration rates.

Coating of the micronized weighting agent with the dispersant may also be performed in a dry blending process such that the process is substantially free of solvent. The process includes blending the weighting agent and a dispersant at a desired ratio to form a blended material. In one embodiment, the weighting agent may be un-sized initially and rely on the blending process to grind the particles into the desired size range as disclosed above. Alternatively, the process may begin with sized weighting agents. The blended material may then be fed to a heat exchange system, such as a thermal desorption system. The mixture may be forwarded through the heat exchanger using a mixer, such as a screw conveyor. Upon cooling, the polymer may remain associated with the weighting agent. The polymer/weighting agent mixture may then be separated into polymer coated weighting agent, unassociated polymer, and any agglomerates that may have formed. The unassociated polymer may optionally be recycled to the beginning of the process, if desired. In another embodiment, the dry blending process alone may serve to coat the weighting agent without heating.

Alternatively, a sized weighting agent may be coated by thermal adsorption as described above, in the absence of a dry blending process. In this embodiment, a process for making a coated substrate may include heating a sized weighting agent to a temperature sufficient to react monomeric dispersant onto the weighting agent to form a polymer coated sized weighting agent and recovering the polymer coated weighting agent. In another embodiment, one may use a catalyzed process to form the polymer in the presence of the sized weighting agent. In yet another embodiment, the polymer may be pre-formed and may be thermally adsorbed onto the sized weighting agent.

In some embodiments, the micronized weighting agent may be formed of particles that are composed of a material of specific gravity of at least 2.3; at least 2.4 in other embodiments; at least 2.5 in other embodiments; at least 2.6 in other embodiments; and at least 2.68 in yet other embodiments. For example, a weighting agent formed of particles having a specific gravity of at least 2.68 may allow wellbore fluids to be formulated to meet most density requirements yet have a particulate volume fraction low enough for the fluid to be pumpable.

As mentioned above, embodiments of the micronized weighting agent may include a deflocculating agent or a dispersant. In one embodiment, the dispersant may be selected from carboxylic acids of molecular weight of at least 150 Daltons, such as oleic acid and polybasic fatty acids, alkylbenzene sulphonic acids, alkane sulphonic acids, linear alpha-olefin sulphonic acids, phospholipids such as lecithin, including salts thereof and including mixtures thereof. Synthetic polymers may also be used, such as HYPERMER OM-1 (Imperial Chemical Industries, PLC, London, United Kingdom) or polyacrylate esters, for example. Such polyacrylate esters may include polymers of stearyl methacrylate and/or butylacrylate. In another embodiment, the corresponding acids methacrylic acid and/or acrylic acid may be used. One skilled in the art would recognize that other acrylate or other unsaturated carboxylic acid monomers (or esters thereof) may be used to achieve substantially the same results as disclosed herein.

When a dispersant coated micronized weighting agent is to be used in water-based fluids, a water soluble polymer of molecular weight of at least 2000 Daltons may be used in a particular embodiment. Examples of such water soluble polymers may include a homopolymer or copolymer of any monomer selected from acrylic acid, itaconic acid, maleic acid or anhydride, hydroxypropyl acrylate vinylsulphonic acid, acrylamido 2-propane sulphonic acid, acrylamide, styrene sulphonic acid, acrylic phosphate esters, methyl vinyl ether and vinyl acetate or salts thereof.

The polymeric dispersant may have an average molecular weight from about 10,000 Daltons to about 300,000 Daltons in one embodiment, from about 17,000 Daltons to about 40,000 Daltons in another embodiment, and from about 200,000-300,000 Daltons in yet another embodiment. One of ordinary skill in the art would recognize that when the dispersant is added to the weighting agent during a grinding process, intermediate molecular weight polymers (10,000-300,000 Daltons) may be used.

Further, it is specifically within the scope of the embodiments disclosed herein that the polymeric dispersant be polymerized prior to or simultaneously with the wet or dry blending processes disclosed herein. Such polymerizations may involve, for example, thermal polymerization, catalyzed polymerization, initiated polymerization or combinations thereof.

Given the particulate nature of the micronized and dispersant coated micronized weighting agents disclosed herein, one of skill in the art should appreciate that additional components may be mixed with the weighting agent to modify various macroscopic properties. For example, anti-caking agents, lubricating agents, and agents used to mitigate moisture build-up may be included. Alternatively, solid materials that enhance lubricity or help control fluid loss may be added to the weighting agents and drilling fluid disclosed herein. In one illustrative example, finely powdered natural graphite, petroleum coke, graphitized carbon, or mixtures of these are added to enhance lubricity, rate of penetration, and fluid loss as well as other properties of the drilling fluid. Another illustrative embodiment utilizes finely ground polymer materials to impart various characteristics to the drilling fluid. In instances where such materials are added, it is important to note that the volume of added material should not have a substantial adverse impact on the properties and performance of the drilling fluids. In one illustrative embodiment, polymeric fluid loss materials comprising less than 5 percent by weight are added to enhance the properties of the drilling fluid. Alternatively, less than 5 percent by weight of suitably sized graphite and petroleum coke are added to enhance the lubricity and fluid loss properties of the fluid. Finally, in another illustrative embodiment, less than 5 percent by weight of a conventional anti-caking agent is added to assist in the bulk storage of the weighting materials.

The particulate materials as described herein (i.e., the coated and/or uncoated micronized weighting agents) may be added to a drilling fluid as a weighting agent in a dry form or concentrated as slurry in either an aqueous medium or as an organic liquid. As is known, an organic liquid should have the necessary environmental characteristics required for additives to oil-based drilling fluids. With this in mind, the oleaginous fluid may have a kinematic viscosity of less than 10 centistokes (10 $mm^2/s$) at 40° C. and, for safety reasons, a flash point of greater than 60° C. Suitable oleaginous liquids are, for example, diesel oil, mineral or white oils, n-alkanes or synthetic oils such as alpha-olefin oils, ester oils, mixtures of these fluids, as well as other similar fluids known to one of skill in the art of drilling or other wellbore fluid formulation. In one embodiment, the desired particle size distribution is achieved via wet milling of the courser materials in the desired carrier fluid.

Wellbore Fluid Formulation

The sized particles described above (i.e., the micronized weighting agents (coated or uncoated) may be used in any wellbore fluid such as drilling, cementing, completion, packing, work-over (repairing), stimulation, well killing, spacer fluids, and other uses of high density fluids, such as in a dense media separating fluid or in a ship's or other vehicle's ballast fluid. Such alternative uses, as well as other uses, of the present fluid should be apparent to one of skill in the art given the present disclosure. In accordance with one embodiment, the weighting agents may be used in a wellbore fluid formulation. The wellbore fluid may be a water-based fluid, a direct emulsion, an invert emulsion, or an oil-based fluid.

Water-based wellbore fluids may have an aqueous fluid as the base liquid and a micronized weighting agent (coated or uncoated). Water-based wellbore fluids may have an aqueous fluid as the base fluid and a micronized weighting agent. The aqueous fluid may include at least one of fresh water, sea water, brine, mixtures of water and water-soluble organic compounds and mixtures thereof. For example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, sulfur, aluminum, magnesium, potassium, strontium, silicon, lithium, and phosphorus salts of chlorides, bromides, carbonates, iodides, chlorates, bromates, formates, nitrates, oxides, and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

The oil-based/invert emulsion wellbore fluids may include an oleaginous continuous phase, a non-oleaginous discontinuous phase, and a micronized weighting agent. One of ordinary skill in the art would appreciate that the micronized weighting agents described above may be modified in accordance with the desired application. For example, modifications may include the hydrophilic/hydrophobic nature of the dispersant.

The oleaginous fluid may be a liquid, more preferably a natural or synthetic oil, and more preferably the oleaginous fluid is selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids; similar compounds known to one of skill in the art; and mixtures thereof. The concentration of the oleaginous fluid should be sufficient so that an invert emulsion forms and may be less than about 99% by volume of the invert emulsion. In one embodiment, the amount of oleaginous fluid is from about 30% to about 95% by volume and more preferably about 40% to about 90% by volume of the invert emulsion fluid. The oleaginous fluid, in one embodiment, may include at least 5% by volume of a material selected from the group including esters, ethers, acetals, dialkylcarbonates, hydrocarbons, and combinations thereof.

The non-oleaginous fluid used in the formulation of the invert emulsion fluid disclosed herein is a liquid and may be an aqueous liquid. In one embodiment, the non-oleaginous liquid may be selected from the group including sea water, a brine containing organic and/or inorganic dissolved salts, liquids containing water-miscible organic compounds, and combinations thereof. The amount of the non-oleaginous fluid is typically less than the theoretical limit needed for forming an invert emulsion. Thus, in one embodiment, the amount of non-oleaginous fluid is less that about 70% by volume, and preferably from about 1% to about 70% by volume. In another embodiment, the non-oleaginous fluid is preferably from about 5% to about 60% by volume of the invert emulsion fluid. The fluid phase may include either an aqueous fluid or an oleaginous fluid, or mixtures thereof. In a particular embodiment, coated barite or other micronized weighting agents may be included in a wellbore fluid having an aqueous fluid that includes at least one of fresh water, sea water, brine, and combinations thereof.

Conventional methods can be used to prepare the drilling fluids disclosed herein in a manner analogous to those normally used, to prepare conventional water- and oil-based drilling fluids. In one embodiment, a desired quantity of water-based fluid and a suitable amount of one or more micronized weighting agents, as described above, are mixed together and the remaining components of the drilling fluid added sequentially with continuous mixing. In another embodiment, a desired quantity of oleaginous fluid such as a base oil, a non-oleaginous fluid, and a suitable amount of one or more micronized weighting agents are mixed together and the remaining components are added sequentially with continuous mixing. An invert emulsion may be formed by vigorously agitating, mixing, or shearing the oleaginous fluid and the non-oleaginous fluid.

Other additives that may be included in the wellbore fluids disclosed herein include, for example, wetting agents, organophilic clays, viscosifiers, fluid loss control agents, surfactants, dispersants, interfacial tension reducers, pH buffers, mutual solvents, thinners, thinning agents, and cleaning agents. The addition of such agents should be well known to one of ordinary skill in the art of formulating drilling fluids and muds.

Advantageously, embodiments of the present disclosure for a wellbore fluid that may be used in drilling and completion of a well. Conventionally, requirements for completion fluids include a solids-free fluid, especially when used in screen completions, so as to reduce or prevent the clogging of the sand control screen. However, by using micronized weighting agents smaller than the mesh of the screen assembly downhole, the micronized weighting agents within the wellbore fluid may easily pass through the screen assembly without risk of plugging. By using the fluids of the present disclosure, rig time may be decreased by avoiding complex displacement operations and the risks associated therewith. Further, the costs associated with high density clear brines may be eliminated while also reducing the risk of wettability changes to the reservoir.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method for drilling and completing a wellbore, comprising:
    drilling a wellbore through a subterranean formation with a wellbore fluid, the wellbore fluid comprising:
        a base fluid; and
        dispersant coated micronized weighting agent; and
    disposing a sand screen in an interval of the wellbore with the wellbore fluid, wherein the micronized weighting agents are smaller than the mesh of the sand screen such that the micronized weighting agents are able to pass through the sand screen.

2. The method of claim 1, wherein the micronized weighting agent is coated with a dispersant made by the method comprising dry blending a micronized weighting agent and a dispersant to form a micronized weighting agent coated with the dispersant.

3. The method of claim 1, wherein the dispersant coated micronized weighting agent comprises colloidal particles.

4. The method of claim 1, further comprising:
gravel packing an interval of the wellbore.

5. The method of claim 1, further comprising:
producing hydrocarbons from the subterranean formation via the wellbore.

6. The method of claim 1, further comprising:
circulating the wellbore fluid in the wellbore.

7. The method of claim 1, wherein the micronized weighting agent is at least one selected from barite, calcium carbonate, dolomite, ilmenite, hematite, olivine, siderite, hausmannite, and strontium sulfate.

8. The method of claim 1, wherein the micronized weighting agent has a particle size $d_{90}$ of less than about 20 microns.

9. The method of claim 1, wherein the micronized weighting agent has a particle size $d_{90}$ of less than about 10 microns.

10. The method of claim 1, wherein the micronized weighting agent has a particle size $d_{90}$ of less than about 5 microns.

11. The method of claim 1, wherein the coating comprises at least one selected from oleic acid, polybasic fatty acids, alkylbenzene sulfonic acids, alkane sulfonic acids, linear alpha-olefin sulfonic acids, alkaline earth metal salts thereof, polyacrylate esters, and phospholipids.

* * * * *

UNITED STATES PATENT AND TRADEMARK OFFICE
CERTIFICATE OF CORRECTION

PATENT NO. : 7,918,289 B2  
APPLICATION NO. : 11/767143  
DATED : April 5, 2011  
INVENTOR(S) : Doug Oakley et al.

Page 1 of 1

It is certified that error appears in the above-identified patent and that said Letters Patent is hereby corrected as shown below:

Column 2, line 58, "Theological" should be --rheological--.

Column 6, line 7, "Theological" should be --rheological--.

Column 6, line 38, "Theological" should be --rheological--.

Column 6, line 56, "Theological" should be --rheological--.

Signed and Sealed this  
Twenty-fifth Day of October, 2011

David J. Kappos  
*Director of the United States Patent and Trademark Office*